United States Patent
Suzuki

(10) Patent No.: US 7,330,772 B2
(45) Date of Patent: Feb. 12, 2008

(54) KNIT DESIGN METHOD AND APPARATUS

(75) Inventor: Noriyuki Suzuki, Wakayama (JP)

(73) Assignee: Shima Seiki Manufacturing Limited, Wakayama (JP)

( * ) Notice: Subject to any disclaimer, the term of this patent is extended or adjusted under 35 U.S.C. 154(b) by 0 days.

(21) Appl. No.: 10/551,778

(22) PCT Filed: Mar. 30, 2004

(86) PCT No.: PCT/JP2004/004496

§ 371 (c)(1),
(2), (4) Date: Oct. 5, 2006

(87) PCT Pub. No.: WO2004/090213

PCT Pub. Date: Oct. 21, 2004

(65) Prior Publication Data

US 2007/0156277 A1   Jul. 5, 2007

(30) Foreign Application Priority Data

Apr. 4, 2003   (JP) ............................. 2003-102033

(51) Int. Cl.
*D04B 15/66* (2006.01)

(52) U.S. Cl. ........................................ 700/139; 66/231

(58) Field of Classification Search ................ 700/131, 700/130, 132, 141

See application file for complete search history.

(56) References Cited

U.S. PATENT DOCUMENTS 5,388,050 A * 2/1995 Inoue et al. ................. 700/131

(Continued)

FOREIGN PATENT DOCUMENTS

EP   0 640 707 A   3/1995

(Continued)

OTHER PUBLICATIONS

European Search Report dated Jun. 14, 2006 issued for corresponding European Patent Application No. 04 724 361.3.

(Continued)

*Primary Examiner*—Danny Worrell
(74) *Attorney, Agent, or Firm*—Harness, Dickey & Pierce, PLC

(57) ABSTRACT

An object of the invention is to display an image having the feeling close to that of a knitted fabric actually knitted with a fuzzy knitting yarn. At least part of knitting yarn image data (1) on a knitting yarn with much fuzz (2) is divided into certain lengths in a length direction in which the knitting yarn image data (1) extends, and is divided into a mesh (5) in an intermediate yarn main frame region and meshes (3, 4) in fuzz regions on both sides thereof in a width direction. Each of the meshes (3, 4, 5) is deformed in accordance with a stitch loop (6) constituting the knitted fabric to form deformed meshes (7, 8) in the fuzz regions and a deformed mesh (9) in the yarn main frame region. In this deformation, the ratio of the deformed meshes (7, 8) in the fuzz regions to the meshes (3, 4) in the fuzz regions is set smaller than the ratio of the deformed mesh (9) in the yarn main frame region to the mesh (5) in the yarn main frame region.

14 Claims, 13 Drawing Sheets

U.S. PATENT DOCUMENTS

| | | |
|---|---|---|
| 5,557,527 A | 9/1996 | Kotaki et al. |
| 5,812,110 A * | 9/1998 | Kawasaki et al. .......... 700/141 |
| 6,880,367 B2 * | 4/2005 | Suzuki ........................ 66/232 |
| 6,895,787 B2 * | 5/2005 | Maeiwa ....................... 66/232 |
| 2005/0039495 A1 * | 2/2005 | Suzuki ........................ 66/232 |
| 2006/0025881 A1 * | 2/2006 | Suzuki ...................... 700/139 |

FOREIGN PATENT DOCUMENTS

| | | |
|---|---|---|
| EP | 0 768 415 A1 | 4/1997 |
| EP | 1 452 985 A | 9/2005 |
| EP | 1577799 A1 | 9/2005 |
| JP | 7-70890 A | 3/1995 |
| JP | 2631946 B2 | 7/1997 |
| WO | WO 03/032203 A1 | 4/2003 |
| WO | WO 2004/051519 A1 | 6/2004 |

OTHER PUBLICATIONS

International Preliminary Report.

Ken'ich Ohta et al., "Simulation of Fabric Surface Pattern by Using Yarn Surface Database," *Hyogo Prefectural Institute of Industrial Research*, pp. T111-T119.

Fujitsu S. Family Designer's Work Bench Shiyo Tebikisho (Textile Designer Shien System), Fujitsu SA Systems Kabushiki Kaisha, May 31, 1995, pp. 66 to 80, 100 to 101.

Ken'ichi Ota et al., "Ito Hyomen Database o Mochiita Orimono Hyomen Pattern Simulation", Sen'i Kikai Gakkaishi, 1990. 12, vol. 43, No. 12, pp. T111 to T119.

International Search Report and Written Opinion.

* cited by examiner

FIG. 12
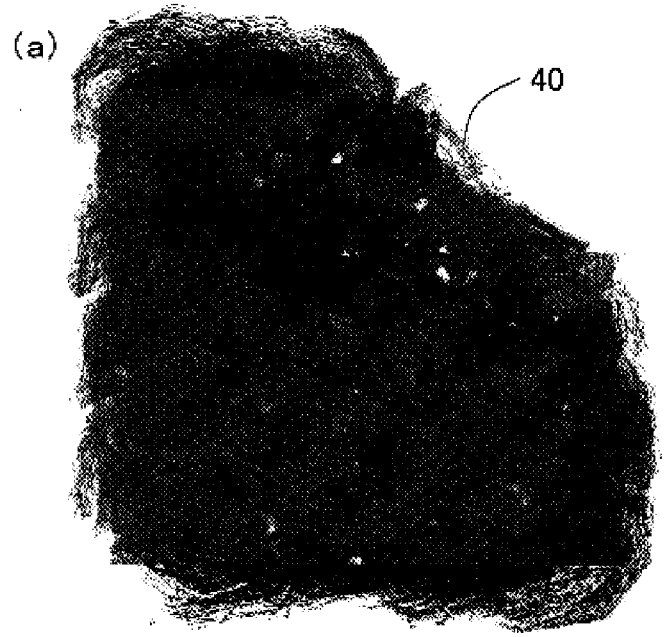
(a)
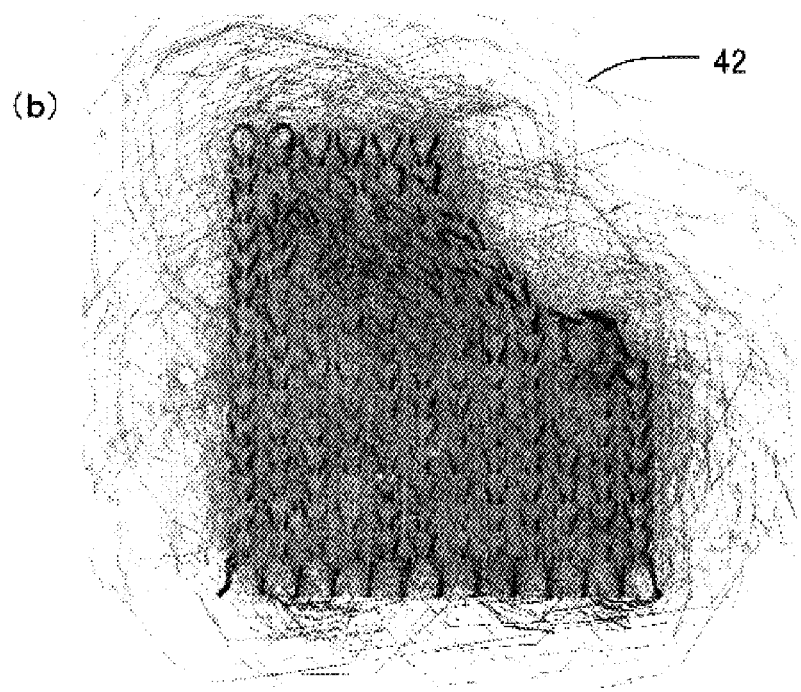
(b)

KNIT DESIGN METHOD AND APPARATUS

TECHNICAL FIELD

The present invention relates to a knit design method and apparatus capable of simulating and displaying an image of a knitted fabric of a knitted article.

BACKGROUND ART

When designing a knitted article, a technique has been conventionally used in which an image of a stitch loop constituting a knitted fabric is simulated and created using data for knitting a knitted fabric, and then the simulation image of the knitted product is displayed (see Japanese Unexamined Patent Publication JP-A 7-70890 (1995)), for example). In this technique, image processing is performed in which image data of a knitting yarn is pre-stored as a yarn sample, the shape, the position, and the contrast in each portion of each stitch loop are determined based on the data for knitting a knitted fabric, and after dividing into a plurality of segments, the image data of the yarn sample is associated with the divided segments to be synthesized as a loop. For the image data that has been divided into segments, the shape of each loop and the overlap with the underlying loop are determined based on the data for knitting a knitted fabric. A spline approximation is performed on the image data of the knitting yarn that has been segmented in accordance with the shape of the loop, a mask is created for the overlap with the underlying loop to keep the exposed portion of the underlying loop, and the image of the knitted fabric is thus simulated. It is possible to express fuzz by making the periphery of the yarn sample rough, and it is also possible to express twine of yarns by adding oblique lines on the yarn sample.

When simulating a knitted fabric using a fuzzy knitting yarn in conventional knit design methods, it is impossible to reflect fuzz sufficiently in a method without consideration to fuzz, and fuzz is emphasized so significantly that the fabric often looks unnatural in a method with consideration to fuzz. This is because even with consideration to fuzz as image data, it is impossible to express an aspect in which the fuzz is flattened by an adjacent knitting yarn during knitting.

In a simulation of a stitch loop as in JP-A 7-70890, fuzz around a knitting yarn or twine of knitting yarns is expressed artificially and is difficult to bring close to the feeling of a knitted fabric knitted with actual knitting yarns. In particular, in the spline approximation on the segments, when the segments are simply connected to each other in a curved section, an edge appears in a section connecting between a segment and a segment, and thus a smooth connection is realized when both ends of the segments are made soft and then overlapped each other. However, in such a connection, it is impossible to assure that fuzz crossing between the divided segments is expressed continuously as the original, and it is difficult to express a natural feeling of a knitted fabric in a simulation image even when image data of a fuzzy knitting yarn is actually used as a color sample.

DISCLOSURE OF INVENTION

It is an object of the invention to provide a knit design method and apparatus capable of displaying an image having the feeling close to that of a knitted fabric actually knitted with a fuzzy knitting yarn.

The invention is directed to a knit design method for simulating and displaying an image of a knitted fabric knitted with a fuzzy knitting yarn based on data for knitting a knitted fabric, comprising:

dividing image data of a knitting yarn extending in a form of a line into fuzz regions on both sides and a yarn main frame region therebetween with respect to a width direction of the knitting yarn, and dividing into a plurality of meshes with a predetermined length in a length direction so that sides in the length direction and sides in the width direction form rectangles, deforming each of the meshes in accordance with a shape of a stitch loop constituting a knitted fabric, deforming the image data of the knitting yarn in accordance with a state of the deformed meshes, and reducing image data of the fuzz regions, and displaying the image data of the knitting yarn on an upper side or a lower side at a portion in which stitch loops overlap each other, in accordance with a predetermined rule, and thereby simulating an image of the knitted fabric.

Furthermore, the invention is characterized in that the image data of the fuzz regions is reduced by contracting the meshes of the fuzz regions when deforming each of the meshes in accordance with the shape of the stitch loop.

Furthermore, the invention is characterized in that the meshes of the fuzz regions are contracted by making a ratio in the deformation smaller.

Furthermore, the invention is characterized in that the contraction ratio is made greater when density of fuzz on an adjacent knitting yarn is high, and is made smaller when the density is small.

Furthermore, the invention is characterized in that at a portion in which the stitch loop is curved, the rectangular shapes of the meshes are deformed so that the sides in the length direction are curved lines.

In addition, the invention is directed to a program for letting a computer execute the knit design method mentioned above.

In addition, the invention is directed to a knit design apparatus for designing a knitted fabric knitted with a fuzzy knitting yarn while displaying an image of the knitted fabric on image display means, comprising:

knitting yarn image storage means for storing image data of a knitting yarn extending in a form of a line, mesh division means for dividing the image data of the knitting yarn read out from the knitting yarn image storage means into fuzz regions on both sides and a yarn main frame region therebetween with respect to a width direction of the knitting yarn, and dividing into a plurality of meshes with a predetermined length in a length direction so that sides in the length direction and sides in the width direction form rectangles, data input means for inputting data for knitting a knitted fabric whose image is to be simulated, knitting yarn image deformation means for deforming each of the meshes in accordance with a shape of a stitch loop constituting a knitted fabric based on the data for knitting a knitted fabric input into the data input means, for deforming the image data of the knitting yarn in accordance with a state of the deformed meshes, and for reducing the image data of the fuzz regions, and knitted fabric simulation means for simulating an image of the knitted fabric by displaying the image data of the knitting yarn deformed in accordance with the stitch loop by the knitting yarn image deformation means, on an upper side or a lower side at a portion in which stitch loops overlap each other, in accordance with a predetermined rule.

BRIEF DESCRIPTION OF DRAWINGS

Other and further objects, features, and advantages of the invention will be more explicit from the following detailed description taken with reference to the drawings wherein:

FIG. 12 is a view showing a result obtained when the knitting yarn image data in FIG. 11 undergoes a conventional process;

BEST MODE FOR CARRYING OUT THE INVENTION

Figure 1:
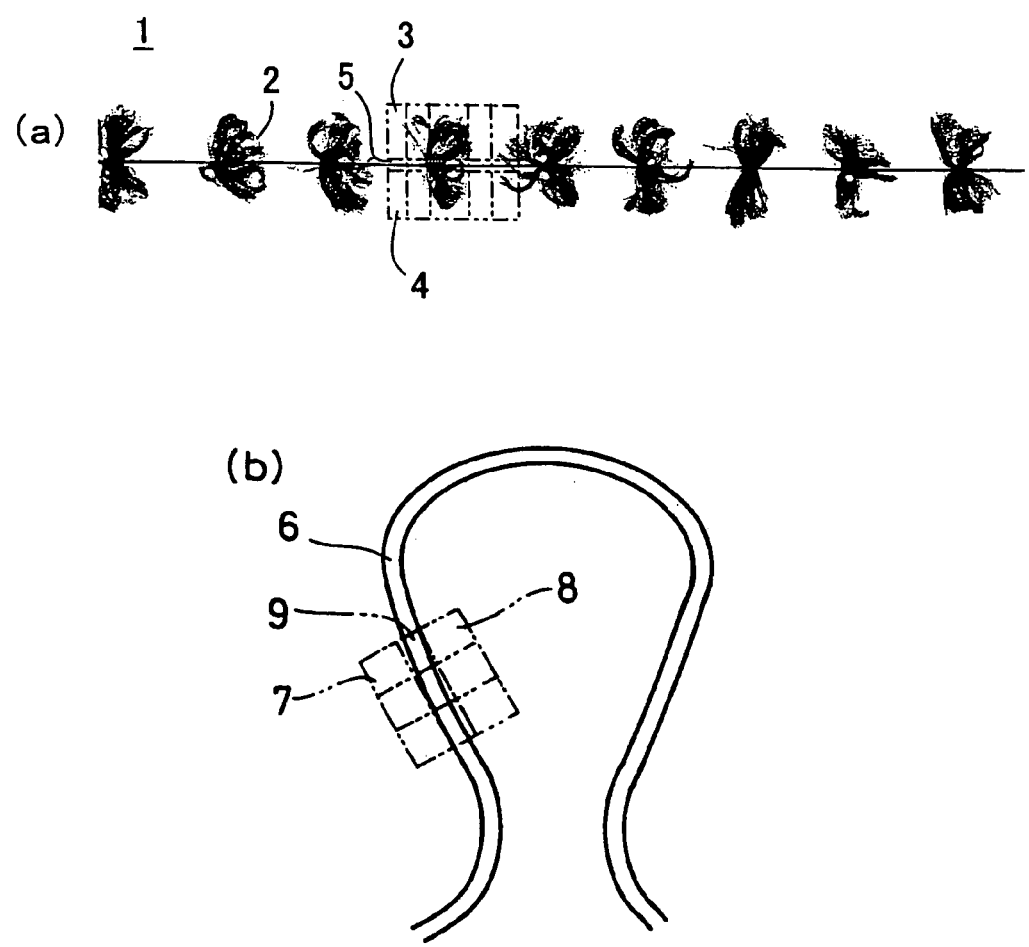
FIG. 1 is a view showing a basic manner of a simulation according to a knit design method according to an embodiment of the invention.

Now referring to the drawings, preferred embodiments of the invention are described below.

FIG. 1 shows a basic manner of a simulation according to a knit design method according to an embodiment of the invention. This embodiment is intended for a knitting yarn having a large amount of fuzz 2 as linear knitting yarn image data 1 as shown in FIG. 1(a). At least a part of the knitting yarn image data 1 is divided by a predetermined length with respect to the length direction in which the knitting yarn image data 1 extends, and divided into meshes 3 and 4 of fuzz regions on both sides and a mesh 5 of a yarn main frame region therebetween with respect to the width direction. Each of the meshes 3, 4, and 5 has a rectangular shape encompassed by sides that are in parallel with the length direction of the knitting yarn image data 1 and sides that are in parallel with the width direction of the knitting yarn.

As shown in FIG. 1(b), each of the meshes 3, 4, and 5 is deformed in accordance with a stitch loop 6 constituting a knitted fabric, and thus deformed meshes 7 and 8 of the fuzz regions and a deformed mesh 9 of the yarn main frame region are formed. During this deformation, the deformed meshes 7 and 8 of the fuzz regions are contracted at any scale factor with respect to the meshes 3 and 4 of the fuzz regions, based on the size of the fuzz and the relationship with adjacent knitting yarns. To each of the positions of the deformed meshes 7, 8, and 9 of the fuzz regions and the yarn main frame region, partial image data at each of the corresponding positions within the rectangular meshes 3, 4, and 5 of the fuzz regions and the yarn main frame region in the knitting yarn image data 1 is applied.

Figure 2:
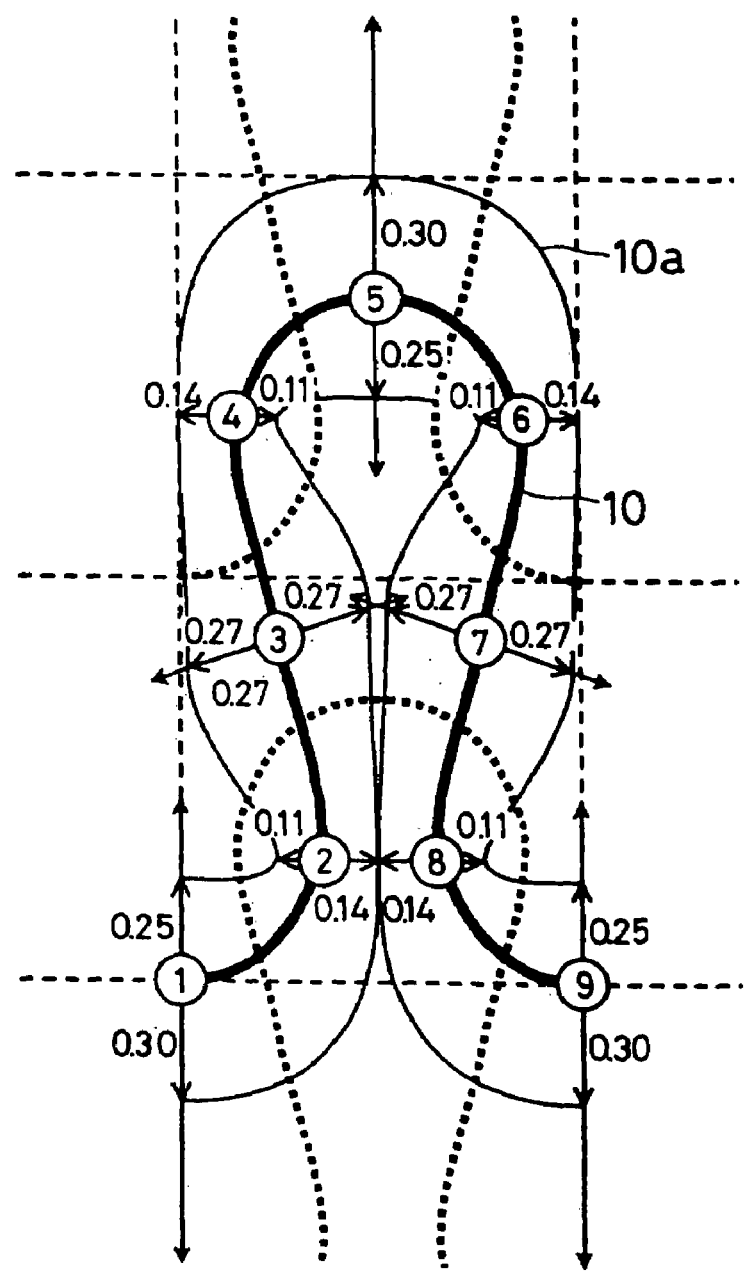
FIG. 2 is a view showing a basic shape 10 of a stitch loop described in the embodiment in FIG. 1.

FIG. 2 shows a basic shape 10 of a stitch loop with the solid line, which is subjected to be simulated in this embodiment. The basic shape 10 is a shape traced by the center of the yarn main frame, is a basic shape of a stitch knitted by letting a knitting needle be displaced to a knit position in a flat knitting machine, and serves as a front stitch or a back stitch in so-called plain knitting. In this embodiment, other than the basic shape 10, a shape without a loop and a shape corresponding to that obtained by plain knitting with miss performed in its below are prepared, as data of a stitch loop. In the data of each stitch loop, the positions of nine control points shown by ① to ⑨ and a limitation 10a of the rendering width shown by the fine solid line are defined. The limitation 10a of the rendering width is limited with respect to its width at control points in contact with an adjacent loop so that a yarn is rendered to be thin by, for example, being hooked on another portion. The numerical values shown at the control points with respect to the limitation 10a are an example of ideal values, and are shown by the ratio when the knitting yarn is divided into the upper and the lower as shown by the broken line and 1 gauge is taken as 1.0. The limitation 10a between the control points is smoothly continuous as shown by the fine solid line. Since yarns sometimes seem to overlap each other in an actual state, the limitation width of the yarn main frame is determined to be a value that is slightly larger, for example, a doubled value. Furthermore, when the width of the yarn main frame is an ideal value, the distance to an adjacent knitting yarn is taken as a value of a fuzz rendering space.

Figure 3:
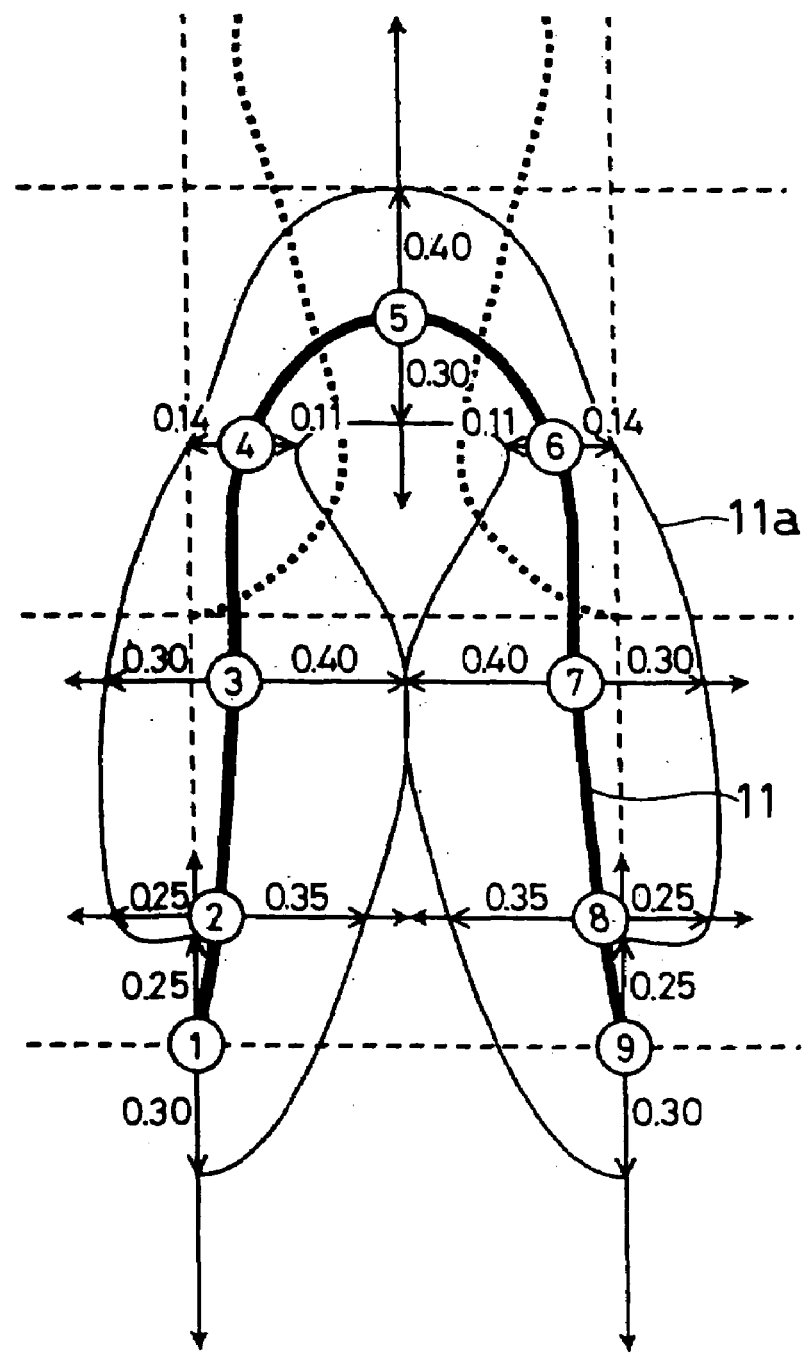
FIG. 3 is a view showing a deformed shape 11 of a stitch loop described in the embodiment in FIG. 1.

FIG. 3 shows a stitch loop of a deformed shape 11, which corresponds to that obtained by plain knitting with miss performed in its below. Also for the deformed shape 11, the positions of nine control points shown by ① to ⑨ and a limitation 11a of the rendering width are defined in the same manner as in FIG. 2. When there is no loop, the shape is a line extending horizontally.

Figure 4:
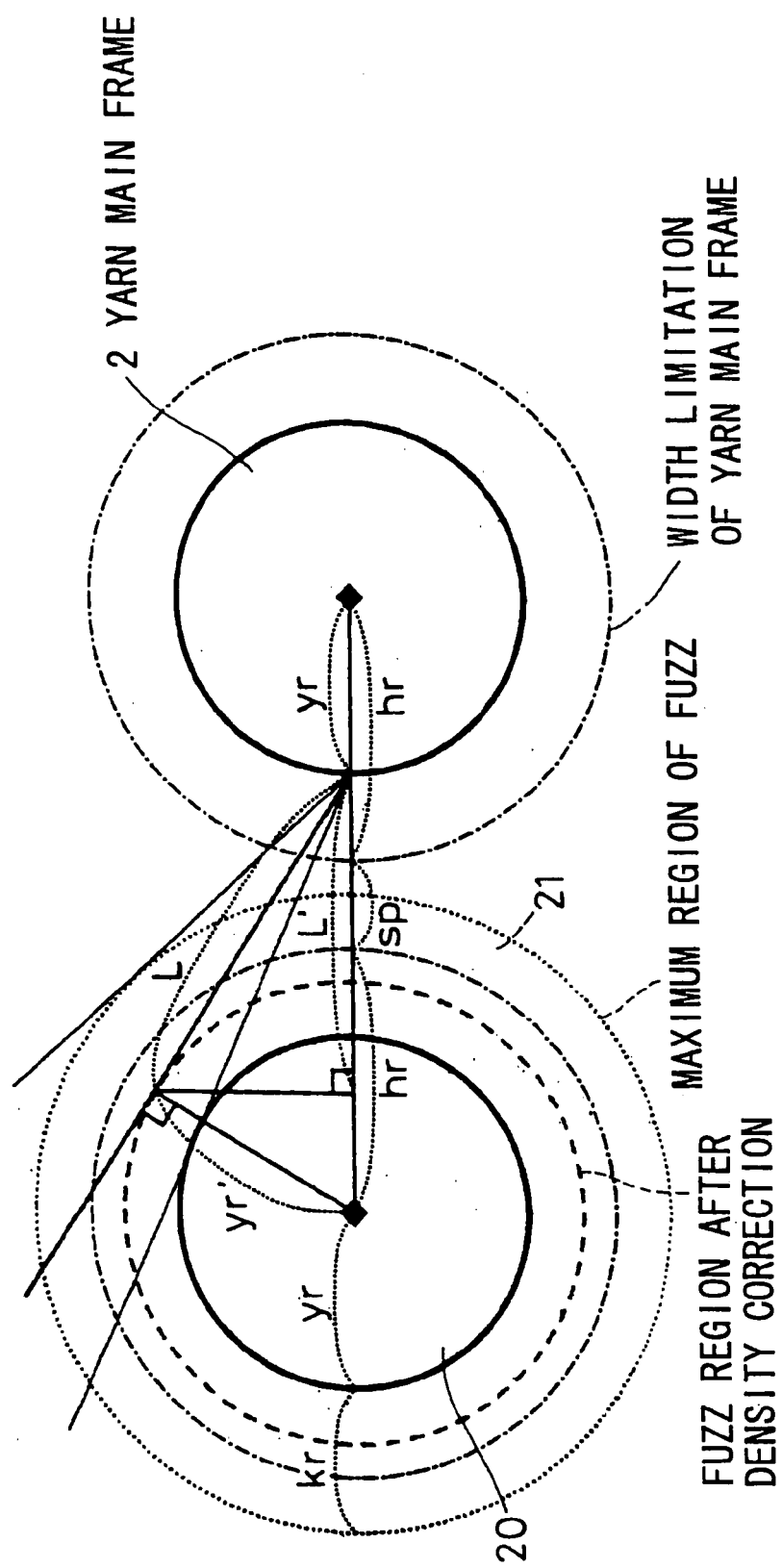
FIG. 4 is a view showing the manner in which the scale factor is calculated when deformed meshes 7 and 8 of fuzz regions are contracted as shown in FIG. 1(b), in the embodiment in FIG. 1.

FIG. 4 shows the manner in which the scale factor is calculated when the deformed meshes 7 and 8 of the fuzz regions are contracted as shown in FIG. 1(b). By performing rendering in such a manner that only the fuzz regions are contracted, an expression is possible in which the fuzz is flattened by, for example, being in contact with an adjacent knitting yarn. The ratio by which the fuzz is flattened is calculated so as to be large in the case in which the density of fuzz on the adjacent knitting yarn is high, and to be small in the case in which the density is small. First, based on the knitting yarn image data 1 as shown in FIG. 1(a), a radius yr of a yarn main frame 20 and a thickness kr of a fuzz region 21 are calculated. The maximum radius of the fuzz is yr+kr. When the density of the fuzz on the adjacent knitting yarn is taken as kden, and it is determined that the contraction ratio of the fuzz region 21 is proportional to the square of the density kden, a radius yr' of a corrected fuzz region 22 shown by the broken line is expressed by Equation (1) below.

$$yr'=yr+kr\times kden^2 \quad (1)$$

The dashed dotted line corresponds to the limitations 10a and 11a of the rendering width shown in FIGS. 2 and 3. When the radius thereof is taken as hr and the fuzz rendering space described above is taken as sp, a length L in the drawing can be expressed by Equation (2) below.

$$L=\sqrt{(hr\times 2-yr+sp)^2-yr'^2} \quad (2)$$

Based on the relationship between the oblique sides and the longer sides of the right-angled triangles shown in the drawing, (hr×2−yr+sp): L=L:L' is satisfied, and thus the scale factor by which the fuzz width is rendered is expressed by Equation (3) below.

$$\frac{L'}{L} = \frac{\sqrt{(hr\times 2 - yr + sp)^2 - yr'^2}}{hr\times 2 - yr + sp} \quad (3)$$

Regarding the lowest value of the fuzz width, the length obtained by multiplying the fuzz width and the rendering scale factor is not to be smaller than the distance (hr×2−yr+sp) to the center of the adjacent yarn.

Figure 5:
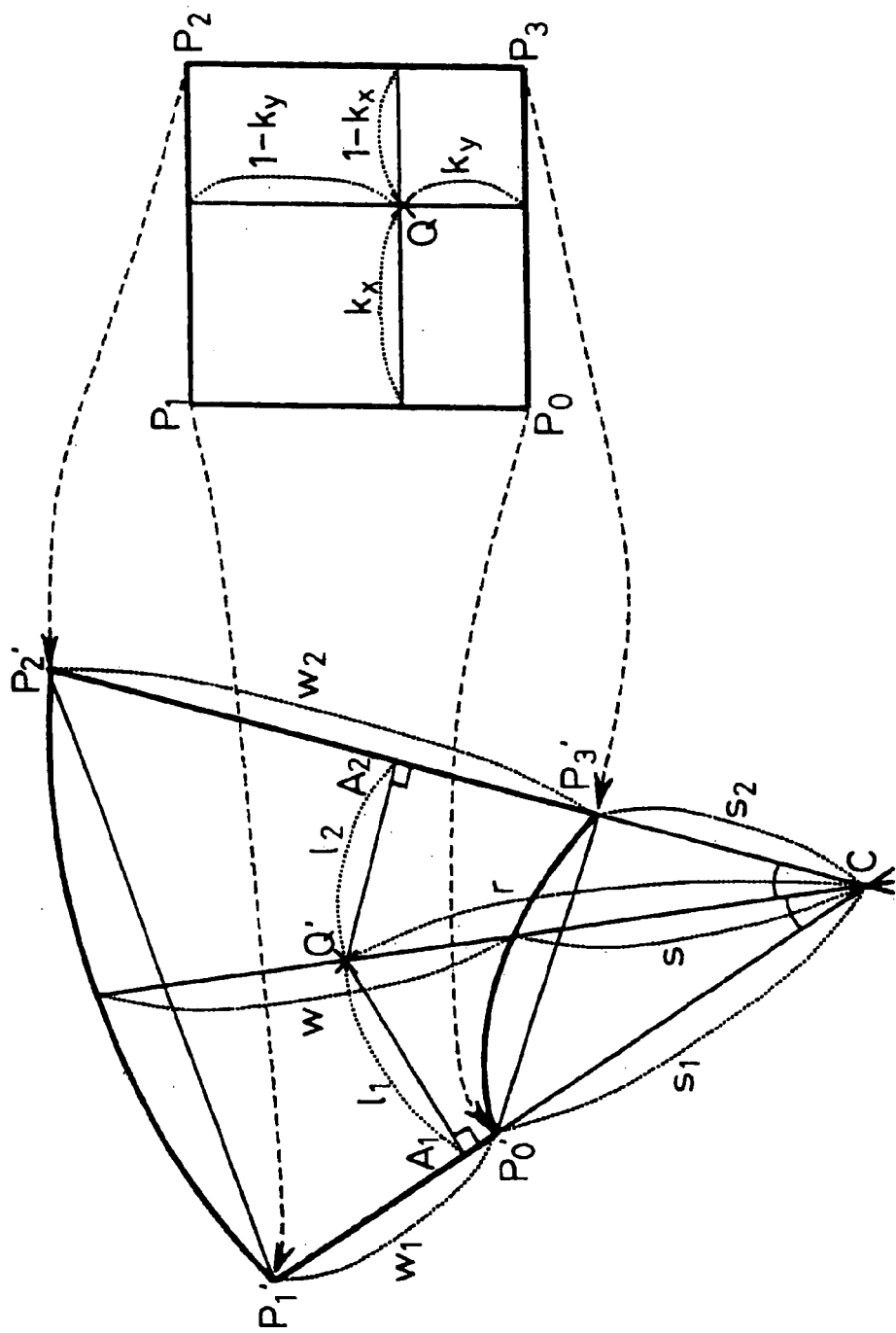
FIG. 5 is a view showing the manner in which sides corresponding to sides that are in parallel with the length direction of an original knitting yarn image data 1 are deformed into curved lines of the deformed meshes 7, 8, and 9 as shown in FIG. 1(b)

FIG. 5 shows the manner in which sides corresponding to sides that are in parallel with the length direction of the original knitting yarn image data 1 are deformed into curved lines of the deformed meshes 7, 8, and 9 as shown in FIG. 1(b). When the knitting yarn image is deformed into a loop shape in the loop simulation, the deformed meshes 7, 8, and 9 are arranged along a locus of the yarn center to create an image. At that time, when the fuzz portion of the yarn is large, the portion bulges outward significantly at a curved portion of the loop so as to be rendered in the form of a straight line in conventional mesh deformation processes.

In a mesh deformation process for a yarn in this embodiment, a yarn is rendered so as to be smoothly continuous by calculating the meshes to be in the form of a curve. For this purpose, first, a rectangle $P_0P_1P_2P_3$ of the original meshes 3, 4, and 5 is deformed into a rectangle $P_0'P_1'P_2'P_3'$ relating to the deformed meshes 7, 8, and 9. At this time, a rendering image is scanned to set a point Q' inside the rectangle $P_0'P_1'P_2'P_3'$. Based on the positional relationship between the rectangle $P_0'P_1'P_2'P_3'$ and the point Q', ratios $k_x$ and $k_y$ are calculated. By calculating the ratios $k_x$ and $k_y$, it is possible to calculate the position of a point Q inside the rectangle $P_0P_1P_2P_3$, and thus a deformed image can be created by copying a pixel of the point Q onto the position of the point Q'.

Next, a distance $l_1$ between the point Q' and the line $P_0'P_1'$ is calculated. The line $P_0'P_1'$ and the point Q' are rotated so that a right angle is formed with the line $P_0'P_1'$, and horizontal positions $x_0''$ ($=x_1''$) and $x_q''$ are found to calculate the distance $l_1=x_q''-x_0''$. When $l_1<0$ is satisfied, the point Q' is determined not to be inside the rectangle $P_0'P_1'P_2'P_3'$.

Furthermore, a distance $l_2$ between the point Q' and the line $P_3'P_2'$ is calculated. The line $P_3'P_2'$ and the point Q' are rotated so that a right angle is formed with the line $P_3'P_2'$, and horizontal positions $x_3''$ ($=x_2''$) and $x_q''$ are found to calculate the distance $l_2=x_3''-x_q''$. When $l_2<0$ is satisfied, the point Q' is determined not to be inside the rectangle $P_0'P_1'P_2'P_3'$.

Since $k_x$: $(1-k_x)=l_1:l_2$, the horizontal ratio $k_x$ can be calculated based on Equation (4) below.

$$k_x = \frac{l_1}{l_1 + l_2} \quad (4)$$

When the positions of the points $P_0'P_1'P_2'P_3'$ are mutually different and an intersecting point is formed by the line $P_0'P_1'$ and the line $P_3'P_2'$ as shown in FIG. 5, the position of an intersecting point C is calculated to calculate the ratio ky. Next, based on the positional relationship between the rectangle $P_0'P_1'P_2'P_3'$ and the intersecting point C, distances $s_1$ and $s_2$ between the intersecting point C and points, in the rectangle $P_0'P_1'P_2'P_3'$, that are closer to the intersecting point C, for example, the points $P_0'$ and $P_3'$ are calculated. Using the horizontal ratio $k_x$, s and w are calculated based on Equations (5) and (6) below.

$$s=s_1\times(1-k_x)+s_2\times k_x \quad (5)$$

$$w=w_1\times(1-k_x)+w_2\times k_x \quad (6)$$

Based on a distance r between the point Q' and the intersecting point C, the vertical ratio ky is calculated based on Equation (7) below.

$$k_y = \frac{r-s}{w} \quad (7)$$

Depending on the positional relationship between the rectangle $P_0'P_1'P_2'P_3'$ and the intersecting point C, $k_y=(1-k_y)$ may be satisfied.

Figure 6:
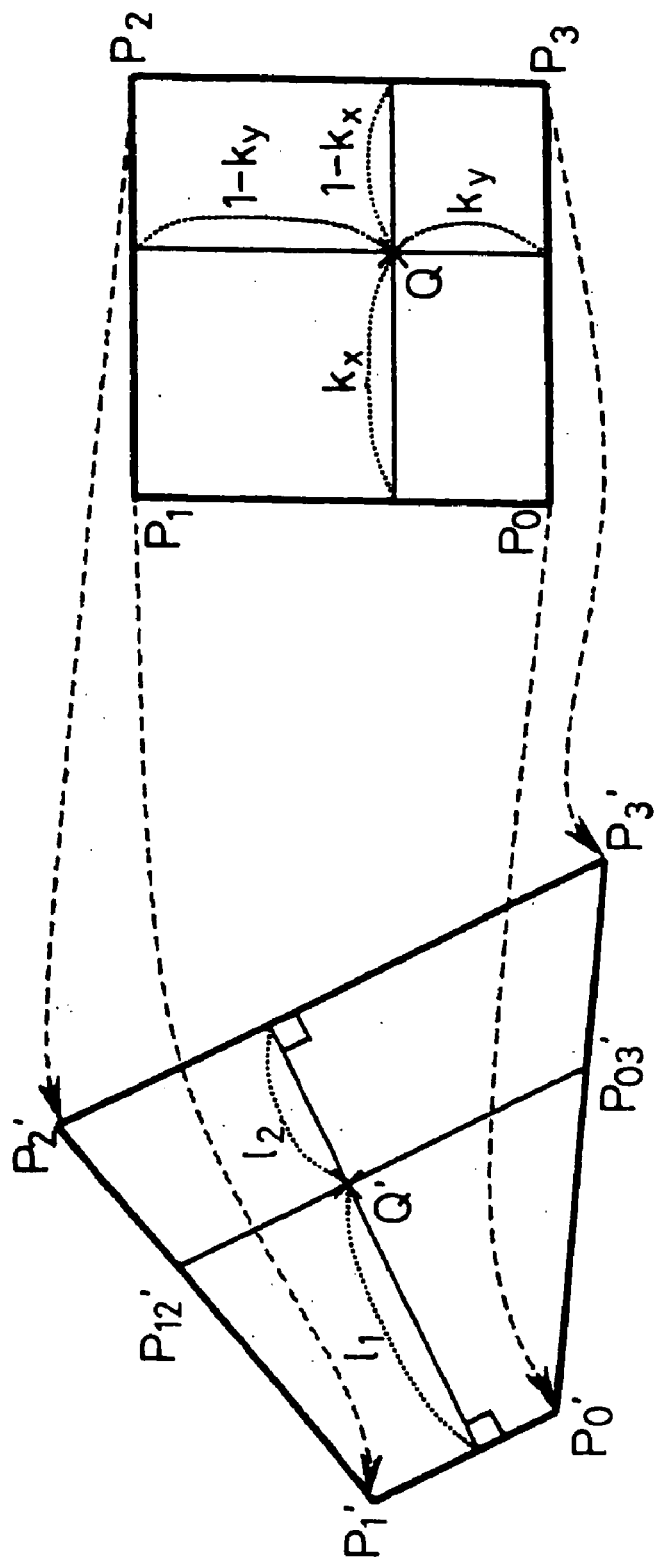
FIG. 6 is a view showing the manner in which an intersecting point is not formed by the line $P_0'P_1'$ and the line $P_3'P_2'$ in FIG. 5.

FIG. 6 shows a method for calculating $k_y$ when an intersecting point is not formed by the line $P_0'P_1'$ and the line $P_3'P_2'$, more specifically, when the points $P_0'$ and $P_1'$ or the points $P_3'$ and $P_2'$ are in the same position, or when the line $P_0'P_1'$ and the line $P_3'P_2'$ are in parallel. First, in order to calculate the vertical ratio $k_y$, the points $P_0'P_1'P_2'P_3'$ are rotated so that a right angle is formed with the line $P_0'P_1'$ (or the line $P_3'P_2'$), and vertical positions $y_0''$, $y_1''$, $y_2''$, and $y_3''$ are found. Based on the horizontal ratio kx, the vertical positions of the points $P_{03}'$ and $P_{12}'$ after the rotation are expressed by Equations (8) and (9) below.

$$y_{03}''=y_0''\times(1.0-k_x)+y_3''\times k_x \quad (8)$$

$$y_{12}''=y_1''\times(1.0-k_x)+y_2''\times k_x \quad (9)$$

Based on the positional relationship between the point Q' and the vertical position $y_q''$ after the rotation, the vertical ratio ky can be calculated based on Equation (10) below.

$$ky = \frac{y_q'' - y_{03}''}{y_{12}'' - y_{03}''} \quad (10)$$

Figure 7:
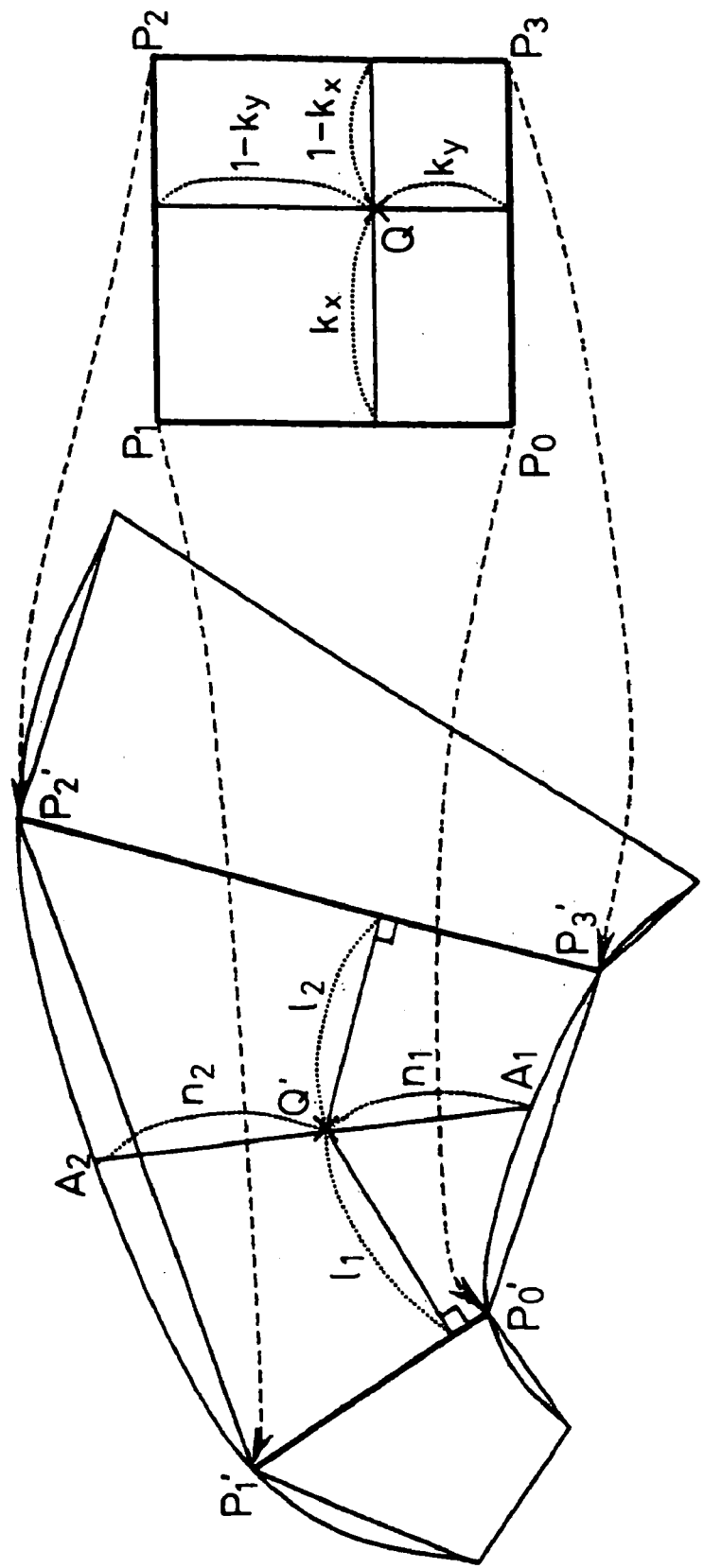
FIG. 7 is a view showing a method for realizing a more realistic expression as a method for calculating a vertical ratio $k_y$, which is in the width direction of the yarn.

FIG. 7 shows a method for realizing a more realistic expression as a method for calculating the vertical ratio $k_y$, which is in the width direction of the yarn. With consideration to the top coordinates of its previous and next meshes, a curve approximation is performed between the points $P_0''$ and $P_1'$, or the points $P_3'$ and $P_2'$. Based on the positional relationship between the point Q' and a point on a curve line calculated using the ratio $k_x$, the ratio $k_y$ is calculated.

Figure 8:
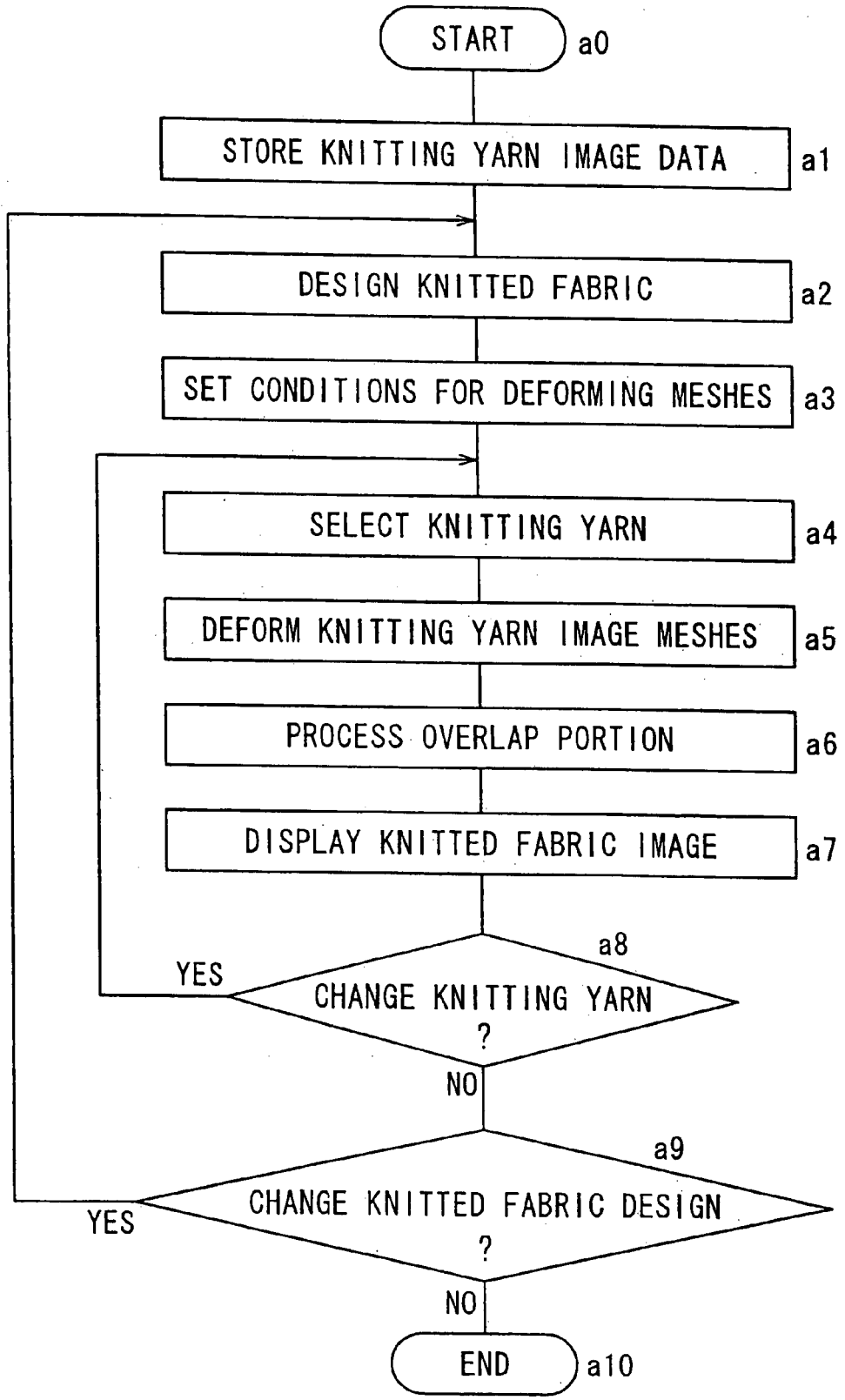
FIG. 8 is a flowchart showing the procedure for simulating an image of a knitted fabric in the embodiment in FIG. 1.

FIG. 8 shows the procedure for simulating an image of a knitted fabric in this embodiment. The procedure starts in step a0, and in step a1, the fuzzy knitting yarn image data 1 as shown in FIG. 1(a) is stored. The knitting yarn image data 1 can be obtained by capturing an image of an actual knitting yarn with, for example, a scanner. Furthermore, the image can be virtually created by applying a technique of computer graphics. In step a2, a knitted fabric is designed. It is possible to use, for example, a design apparatus for a flat knitting machine. With such a design apparatus, knitting data specifying the type of each stitch is created. In step a3, the shapes of the deformed meshes 7, 8, and 9 are set in accordance with the loop shape at each stitch.

In step a4, for example, the user selects a knitting yarn from among those stored as the knitting yarn image data 1. Next, in step a5, a stitch image is created by mesh deformation using the selected knitting yarn, as shown in FIG. 1(b). In step a6, a process is performed on a portion in which knitting loops overlap each other in the stitch image. In step a7, the knitted fabric is displayed.

In step a8, the designer confirms the displayed image of the knitted fabric, and determines whether or not the knitting yarns is further changed. When it is determined that the knitting yarn is changed, the procedure returns to step a4, and other yarn image data 1 is selected. Even when the knitting yarn is not changed in step a8, it is determined whether or not the knitted fabric design itself is changed, in step a9. When there is a change, the procedure returns to step a2, and a predetermined editing operation and other operations are performed to design the knitted fabric. When there is no change in step a9, the procedure ends in step a10.

Figure 9:
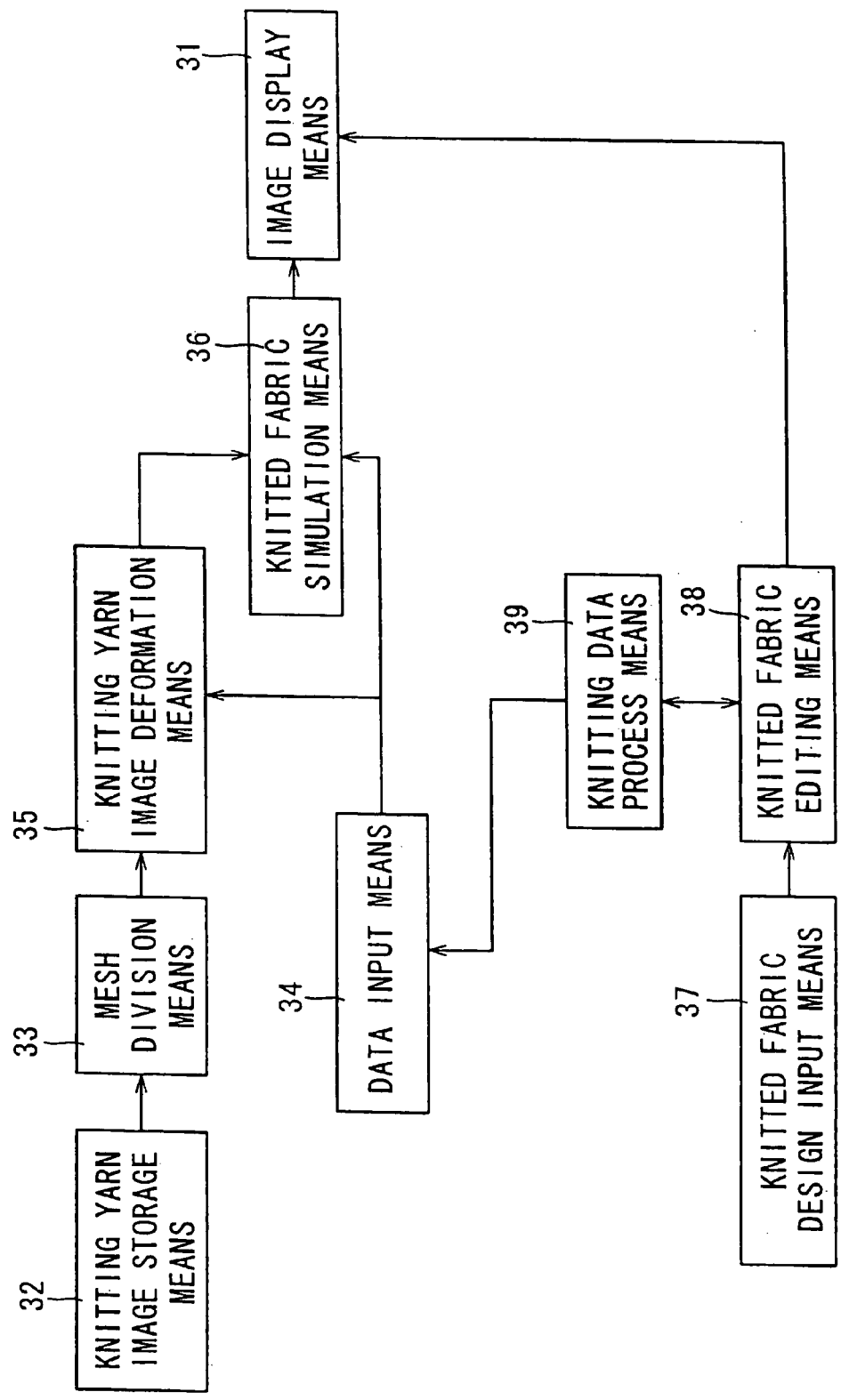
FIG. 9 is a block diagram showing a schematic functional configuration of a knit design apparatus 30 for performing the knit design method in FIG. 1.

FIG. 9 shows a schematic functional configuration of a knit design apparatus 30 for performing the knit design method in FIG. 1. The knit design apparatus 30 designs a knitted fabric by, for example, arranging a texture pattern on a knitted fabric to be designed, with stitch symbols or others expressing codes for knitting a knitted fabric, and displays the result on image display means 31. The knit design apparatus 30 includes knitting yarn image storage means 32, mesh division means 33, data input means 34, knitting yarn image deformation means 35, knitted fabric simulation means 36, knitted fabric design input means 37, knitted fabric editing means 38, and knitting data process means 39.

The knitting yarn image storage means 32 pre-stores a plurality of types of the knitting yarn image data 1. The background is included in the knitting yarn image data 1 in FIG. 1(a), but it is possible to eliminate the background by, for example, chroma-key.

The mesh division means 33 divides the knitting yarn image data 1 into the meshes 3 and 4 of the fuzz regions and the mesh 5 of the yarn main frame region as shown in FIG. 1(a).

Into the data input means 34, knitting data of a knitted fabric that is to be simulated is input. The knitting data of a knitted fabric is the same as conventional knitting data and specifies a knitting method for each stitch constituting the knitted fabric.

Based on the data for knitting a knitted fabric that has been input into the data input means 34, the knitting yarn image deformation means 35 deforms each of the meshes 3, 4, and 5 in accordance with the shape of a stitch loop constituting the knitted fabric, deforms the knitting yarn image data 1 in accordance with the deformed state of the meshes 3, 4, and 5, and reduces image data of the fuzz regions.

The knitted fabric simulation means 36 simulates the knitted fabric by deforming the knitting yarn image data 1, with respect to each of the meshes 3, 4, and 5 that have been divided by the mesh division means 33, into the shape of each of the meshes 7, 8, and 9 that have been set by the knitting yarn image deformation means 35. The result of the simulation is displayed as an image on the image display means 31. When forming a texture pattern by changing the basic stitch shape of a stitch in the knitted fabric, an influence received by stitches knitted around the stitch is also reflected on the shapes of the deformed meshes 7, 8, and 9 as described above, and thus it is possible to create a knitted fabric image that is close to the real.

The knitted fabric design input means 37 is provided for an input operation for, for example, arranging an image of a stitch loop that is prepared in advance to design the knitted fabric. The knitted fabric editing means 38 performs an editing process in which, for example, a texture pattern is arranged on a basic knitted fabric, and the shape is changed or the position is changed. By the knitting data process means 39, the data for knitting a knitted fabric corresponding to the knitted fabric image created by the knitted fabric editing means 38 is created and is input into the data input means 34. With this procedure, it is possible to perform a simulation based on the design result of the knitted fabric.

It should be noted that stitch image data used for designing the knitted fabric can be created by a method for simulating a knitted fabric 6. With this procedure, it is possible to perform, without a sense of incongruity, the entire operations in which a knitting yarn is selected, a set of the shapes of stitch loops for designing with the selected knitting yarn are prepared, and the design result is simulated as the knitted fabric 6.

The knit design apparatus 30 in FIG. 9 can be also realized by letting a general purpose computer apparatus read a program. The program can be stored in a ROM in the computer apparatus, or can be stored on, for example, a hard disk and then executed by being read out on the main memory. The program stored on, for example, a hard disk can be stored on a storage medium such as a CD (compact disk)-ROM, a DVD (digital versatile disc)-ROM, an FD (flexible disk), and an MD (mini disc), or can be downloaded via an information communication network such as the Internet and made usable in the computer apparatus.

Figure 10:
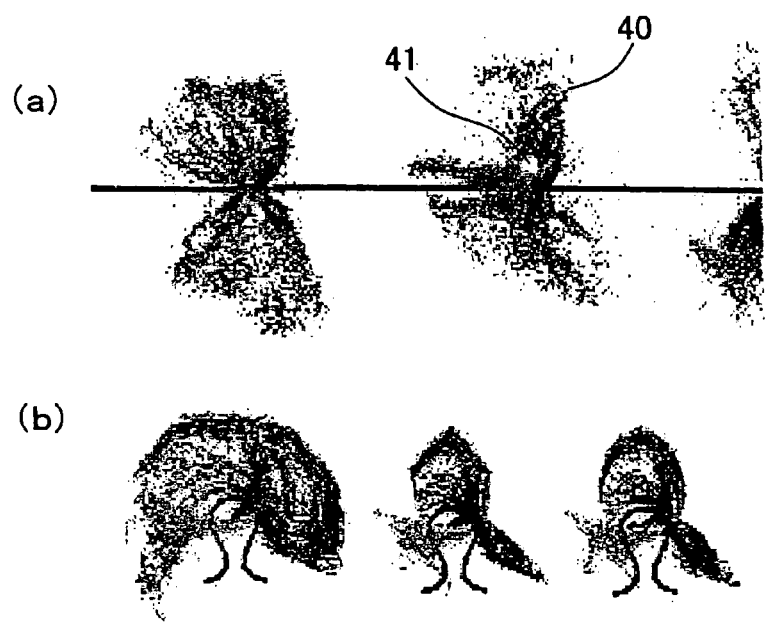
FIG. 10 is a view showing an example of an image of a fuzzy yarn and an example of a stitch loop rendered using the image data of the yarn.

FIG. 10(a) shows an example of an image of a fuzzy yarn, and FIG. 10(b) shows an example of a stitch loop rendered using the image data of the yarn. In this knitting yarn, there is a granular texture 41 in the vicinity of the root of fuzz 40, and when the fuzz 40 is emphasized too significantly, the granular texture 41 is hard to see.

Figure 11:
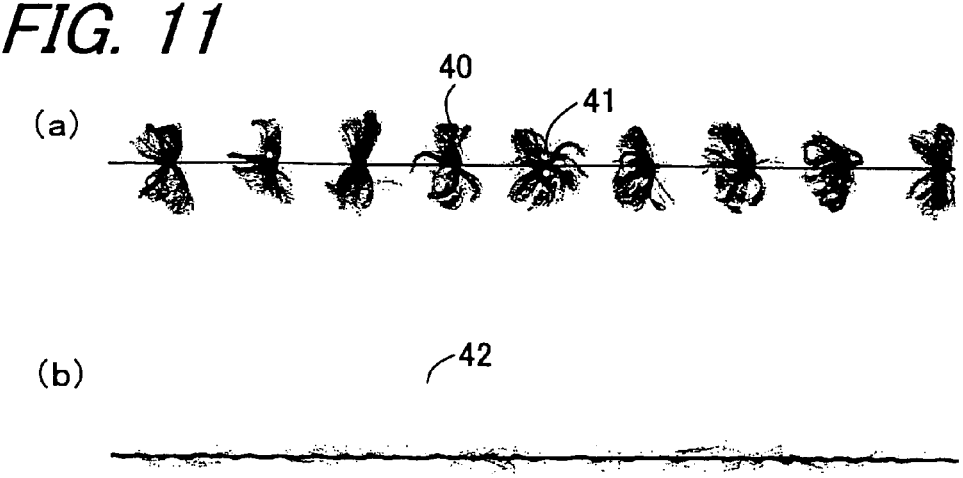
FIG. 11 is a view showing an example of image data of a fuzzy knitting yarn.

FIG. 11(a) shows knitting yarn image data similar to that in FIG. 10(a), and FIG. 11(b) shows image data of a knitting yarn having another type of fuzz 42. The fuzz 42 is in a wide range, but the density is low.

FIG. 12 shows knitted fabric image rendered based on the knitting yarn image data shown in FIGS. 11(a) and 11(b). FIGS. 12(a) and 12(b) show a result of a process in which sides of meshes are kept to be straight lines, and, for example, fuzz regions are not contracted.

Figure 13:
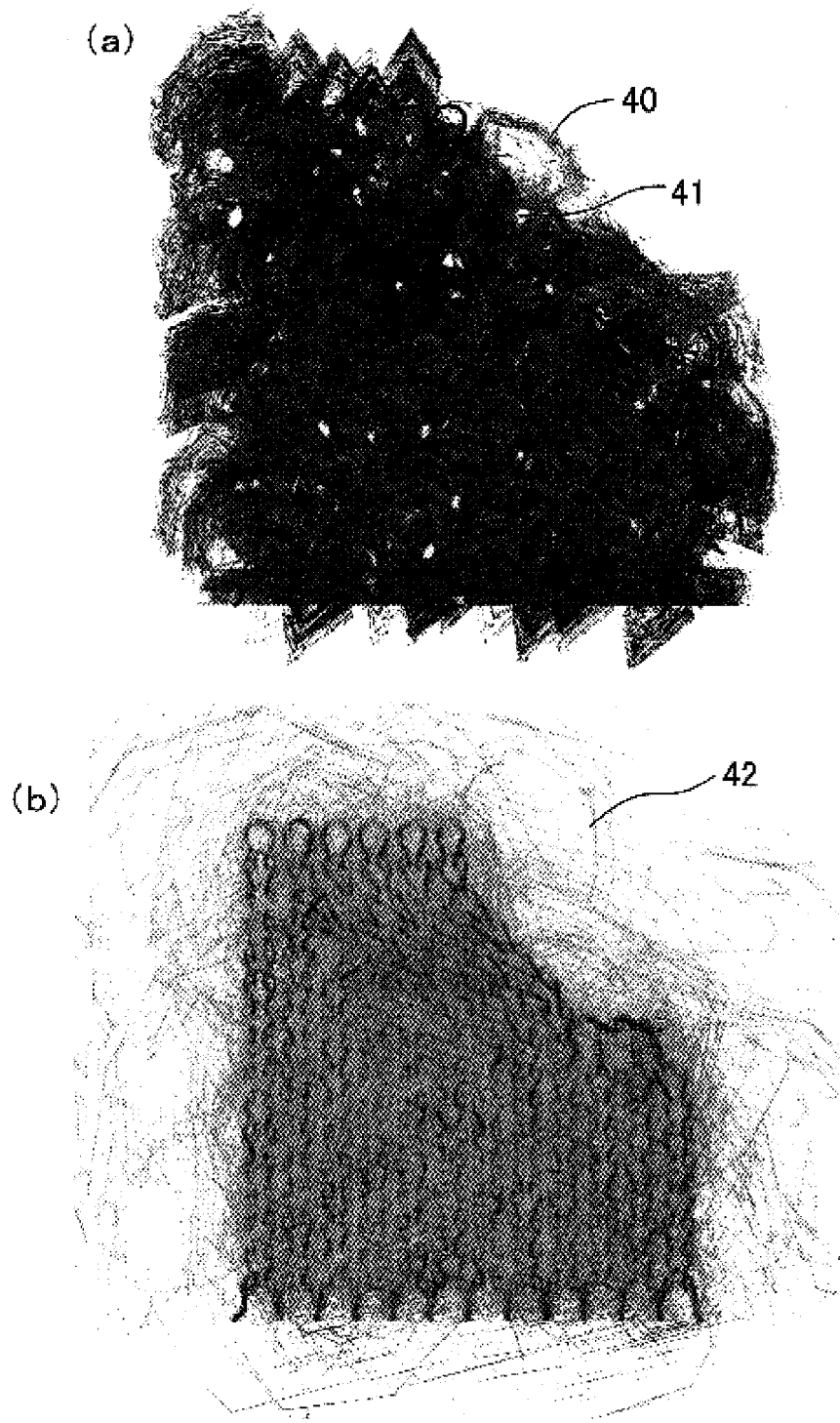
FIG. 13 is a view showing a result obtained when the knitting yarn image data in FIG. 11 undergoes a process of contracting a fuzz region according to the embodiment in FIG. 1.

FIG. 13 shows a result of image processing in which the amount of fuzz is adjusted by contracting the fuzz regions, based on the knitting yarn image data shown in FIGS. 11(a) and 11(b). As seen in the image in FIG. 13(a), the granular texture 41 is displayed more clearly than in FIG. 12(a).

Figure 14:
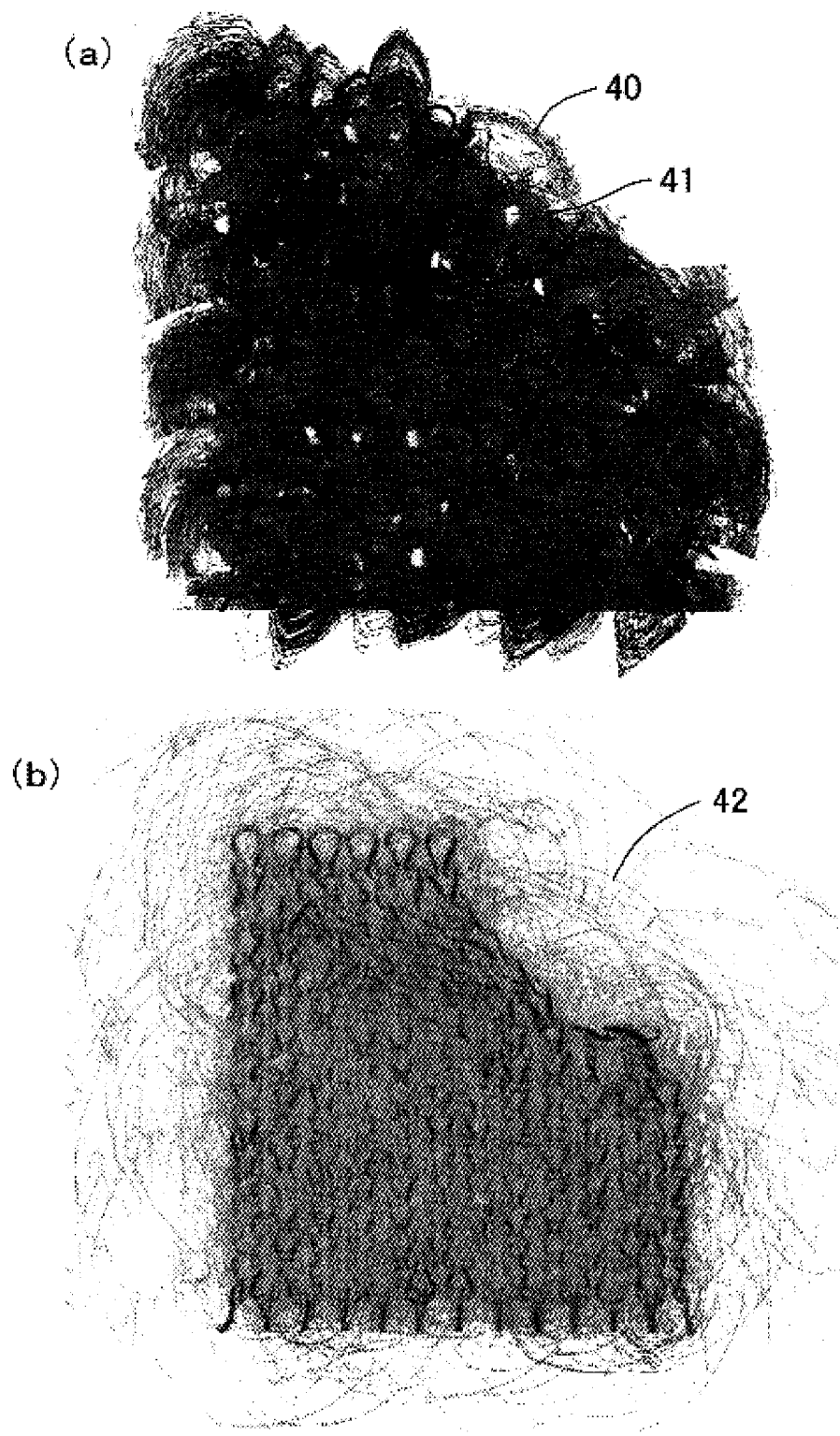
FIG. 14 is a view showing a result obtained when the knitting yarn image data in FIG. 11 undergoes processes of contracting a fuzz region and of deforming a mesh into a curve line according to the embodiment in FIG. 1.

FIG. 14 shows a result of image processing in which the amount of fuzz is adjusted by contracting the fuzz regions and sides of meshes are deformed into curve lines, based on the knitting yarn image data shown in FIGS. 11(a) and 11(b). As seen in the image shown in FIG. 14(b), the fuzz 42 is rendered naturally.

By comparing FIGS. 12 and 13, an effect obtained by contracting fuzz regions is clear. An image of a knitting yarn extending in the form of a line is divided into rectangular meshes by dividing into fuzz regions on both sides and a yarn main frame region therebetween with respect to the width direction of the knitting yarn. When the meshes are deformed in accordance with the shape of a stitch loop and image data of the knitting yarn is deformed in accordance with the meshes, image data of the fuzz regions is reduced in FIG. 13, and thus fuzz that is likely to be flattened by an adjacent knitting yarn can be adequately displayed. Since fuzz that is likely to be flattened by an adjacent knitting yarn can be adequately displayed, it is possible to display an image having the feeling close to that of a knitted fabric actually knitted with a fuzzy knitting yarn. In particular, it is possible to clearly render, for example, the granular texture 41 at the root of fuzz.

By comparing FIGS. 12 and 14, an effect obtained by deforming sides of meshes into curve lines is clear. Even when meshes bulge significantly while an image of a knitting yarn having a wide fuzz region is deformed in accordance with a stitch loop, the sides of the meshes are curved lines in FIG. 14, and thus a natural image can be displayed by connecting the meshes smoothly.

Furthermore, when deforming each of the meshes in accordance with the shape of the stitch loop, the mesh of the fuzz region is contracted, and thus the data amount of the image is reduced. The fuzz region is flattened more when the density of fuzz on the adjacent knitting yarn is high, and thus the contraction ratio is made greater, so that the ratio of the fuzz region flattened is made greater. The ratio of the fuzz region flattened is made smaller when the density of fuzz on the adjacent knitting yarn is small. In this manner, it is possible to display a natural image.

It is also possible to contract a mesh of a fuzz region by folding the mesh at the time of deformation. When the mesh of the fuzz region is folded to be contracted, image data of the fuzz region is displayed in a folded state, so that it is possible to express an aspect in which the fuzz is flattened by, for example, an adjacent knitting yarn.

It is also possible to reduce the image data of the fuzz region by increasing the transparency of the image data of the fuzz region. By increasing the transparency of the fuzz region, even when the fuzz region is on the adjacent knitting yarn, the behind knitting yarn is also displayed, and thus it is possible to display an aspect of the fuzz region that is likely to be flattened.

Furthermore, it is possible to reduce the image data of the fuzz region by thinning the image data of the fuzz region. By thinning the image data of the fuzz region, the portions of the fuzz region displayed are reduced, and thus it is possible to display an aspect of the fuzz region that is likely to be flattened.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As mentioned above, according to the invention, an image of a knitting yarn extending in the form of a line is divided into rectangular meshes by dividing into fuzz regions on both sides and a yarn main frame region therebetween with respect to the width direction of the knitting yarn. When the meshes are deformed in accordance with the shape of a stitch loop and image data of the knitting yarn is deformed in accordance with the meshes, image data of the fuzz regions is reduced, and therefore fuzz that is likely to be flattened by an adjacent knitting yarn can be adequately displayed. Since fuzz that is likely to be flattened by an adjacent knitting yarn can be adequately displayed, it is possible to display an image having the feeling close to that of a knitted fabric actually knitted with a fuzzy knitting yarn.

Furthermore, according to the invention, the meshes of the fuzz regions are contracted. Thus, it is possible to adequately express an aspect in which the fuzz is flattened by an adjacent knitting yarn.

Furthermore, according to the invention, when deforming the meshes in accordance with the stitch loop, the contraction can be easily performed by making the ratio of the meshes of the fuzz regions small.

Furthermore, according to the invention, the fuzz region is flattened more when the density of fuzz on the adjacent knitting yarn is high, and thus the contraction ratio is made greater, so that the ratio of the fuzz region flattened is made greater. The ratio of the fuzz region flattened is made smaller when the density of the fuzz is small. In this manner, it is possible to display a natural image.

Furthermore, according to the invention, even when meshes bulge significantly while an image of a knitting yarn having a wide fuzz region is deformed in accordance with a stitch loop, the sides of the meshes are curved lines, and thus a natural image can be displayed by connecting the meshes smoothly.

Furthermore, according to the invention, by a computer simulation, it is possible to adequately display the feeling of a knitted fabric knitted using a fuzzy knitting yarn.

Furthermore, according to the invention, an image of a knitting yarn extending in the form of a line stored by the image storage means is divided into rectangular meshes by dividing into fuzz regions on both sides and a yarn main frame region therebetween with respect to the width direction of the knitting yarn by the mesh division means. When the knitting yarn image deformation means deforms the meshes in accordance with the shape of the stitch loop and deforms the image data of the knitting yarn in accordance with the meshes, the image data of the fuzz regions is reduced, and thus fuzz that is likely to be flattened by an adjacent knitting yarn can be adequately displayed. Since fuzz that is likely to be flattened can be adequately displayed, it is possible to display an image having the feeling close to that of a knitted fabric actually knitted with a fuzzy knitting yarn.

The invention claimed is:

1. A knit design method for simulating and displaying an image of a knitted fabric with a fuzzy knitting yarn based on data for knitting a knitted fabric, comprising:

dividing image data of a knitting yarn extended in a form of a line into fuzz regions on both sides and a yarn main frame region therebetween with respect to a width direction of the knitting yarn, and dividing into a plurality of meshes with a predetermined length in a length direction so that sides in the length direction and sides in the width direction form rectangles, deforming each of the meshes in accordance with a shape of a stitch loop constituting a knitted fabric, deforming the image data of the knitting yarn in accordance with a state of the deformed meshes, and reducing image data of the fuzz regions, and displaying the image data of the knitting yarn on an upper side or a lower side at a portion in which stitch loops overlap each other, in accordance with a predetermined rule, and thereby simulating an image of the knitted fabric.

2. The knit design method of claim 1, wherein the image data of the fuzz regions is reduced by contracting the meshes of the fuzz regions when deforming each of the meshes in accordance with the shape of the stitch loop.

3. The knit design method of claim 2, wherein the meshes of the fuzz regions are contracted by making a ratio in the deformation smaller.

4. The knit design method of claim 3, wherein the contraction ratio is made greater when density of fuzz on an adjacent knitting yarn is high, and is made smaller when the density is small.

5. The knit design method of claim 1, wherein at a portion in which the stitch loop is curved, the rectangular shapes of the meshes are deformed so that the sides in the length direction are curved lines.

6. A computer readable medium including a program of instructions executable by a computer to perform the knit design method of claim 1.

7. A knit design apparatus for designing a knitted fabric knitted with a fuzzy knitting yarn while displaying an image of the knitted fabric on image display means, comprising:

knitting yarn image storage means for storing data of a knitting yarn extending in a form of a line, mesh division means for dividing the image data of the knitting yarn read out from the knitting yarn image storage means into fuzz regions on both sides and a yarn main frame region therebetween with respect to a width direction of the knitting yarn, and dividing into a plurality of meshes with a predetermined length in a length direction so that sides in the length direction and sides in the width direction form rectangles, data input means for inputting data for knitting a knitted fabric whose image is to be simulated, knitting yarn image deformation means for deforming each of the meshes in accordance with a shape of a stitch loop constituting a knitted fabric based on the data for knitting a knitted fabric input into the data input means, for deforming the image data of the knitting yarn in accordance with a state of the deformed meshes, and for reducing the image data of the fuzz regions, and knitted fabric simulation means for simulating an image of the knitted fabric by displaying the image data of the knitting yarn deformed in accordance with the stitch loop by the knitting yarn image deformation means, on an upper side or a lower side at a portion in which stitch loops overlap each other, in accordance with a predetermined rule.

8. The knit design method of claim 2, wherein at a portion in which the stitch loop is curved, the rectangular shapes of the meshes are deformed so that the sides in the length direction are curved lines.

9. The knit design method of claim 3, wherein at a portion in which the stitch loop is curved, the rectangular shapes of the meshes are deformed so that the sides in the length direction are curved lines.

10. The knit design method of claim 4, wherein at a portion in which the stitch loop is curved, the rectangular shapes of the meshes are deformed so that the sides in the length direction are curved lines.

11. A computer readable medium including a program of instructions executable by a computer to perform the knit design method of claim 2.

12. A computer readable medium including a program instructions executable by a computer to perform the knit design method of claim 3.

13. A computer readable medium including a program instructions executable by a computer to perform the knit design method of claim 4.

14. A computer readable medium including a program of instructions executable by a computer to perform the knit design method of claim 5.

* * * * *